United States Patent [19]
Bay et al.

[11] Patent Number: 5,474,504
[45] Date of Patent: Dec. 12, 1995

[54] ASYMMETRIC PLANETARY GEAR VARIABLE SPEED TRANSMISSION

[75] Inventors: Adam G. Bay; Gabor A. Bay, both of Chesterland, Ohio

[73] Assignee: De Bay, Inc., Chesterland, Ohio

[21] Appl. No.: 133,517

[22] Filed: Oct. 7, 1993

[51] Int. Cl.$^6$ ........................................ F16H 3/68
[52] U.S. Cl. ........................ 475/274; 475/301; 475/304; 192/41 S; 192/81 C
[58] Field of Search ................................ 475/268, 269, 475/273, 274, 297, 301, 304, 219, 331, 333, 336; 192/41 S, 56 C, 81 C

[56] References Cited

U.S. PATENT DOCUMENTS

| | | | |
|---|---|---|---|
| 2,886,985 | 5/1959 | Meyer | 192/41 S |
| 2,959,986 | 11/1960 | Irgens et al. | 192/41 S |
| 4,674,612 | 6/1987 | Ogura | 192/81 C |

Primary Examiner—Charles A. Marmor
Assistant Examiner—Sherry Estremsky
Attorney, Agent, or Firm—Renner, Otto, Boisselle & Sklar

[57] ABSTRACT

An infinitely variable forward speed mechanical transmission uses asymmetric helical/spur gear trains mounted to rotate within a rotor assembly to reduce the torque output within the rotor assembly through inefficiency of the asymmetric gear trains. The rotor assembly includes integrated input and output hubs having adjacent radially flush outer control surfaces, with the output hub in mesh with the asymmetric helical/spur gear trains in mesh with an output shaft. A transmission speed control device connected to a control gear connected to a control tang of a wrap spring positioned about the control surfaces of the input and output hubs provides infinitely variable control of the relative rotation of the two hubs to selectively control the torque output of the transmission. A planetary gear set in constant mesh with the transmission input through the input hub provides a full-time low-gear ratio, and an attached dual sprague clutch assembly determines the driving output train of the transmission between the planetary gear set and the output shaft.

13 Claims, 4 Drawing Sheets

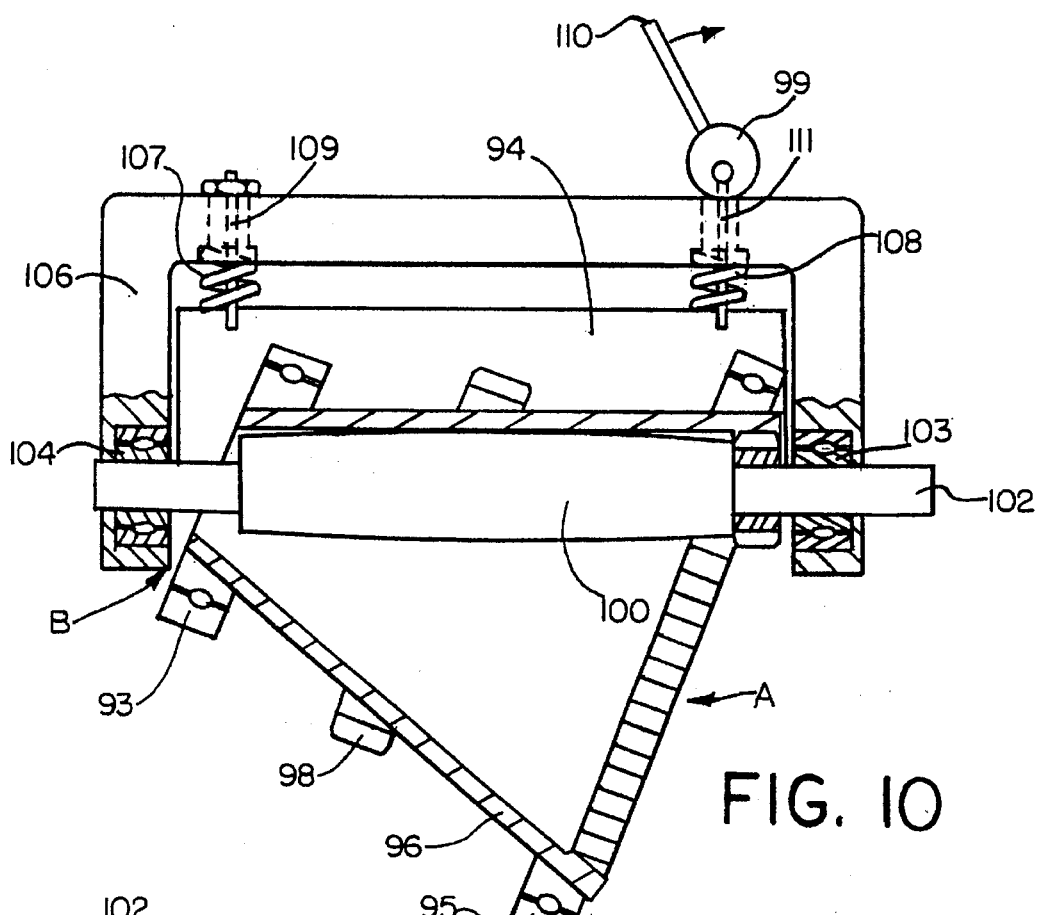
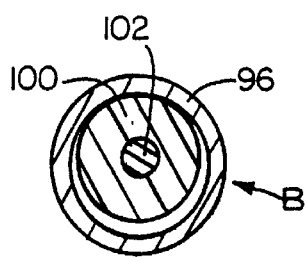
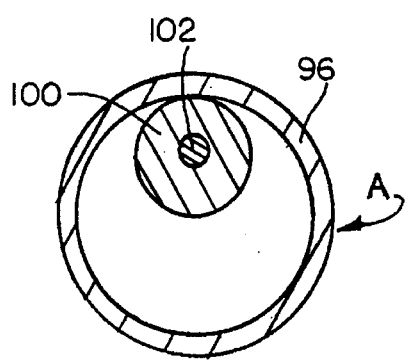
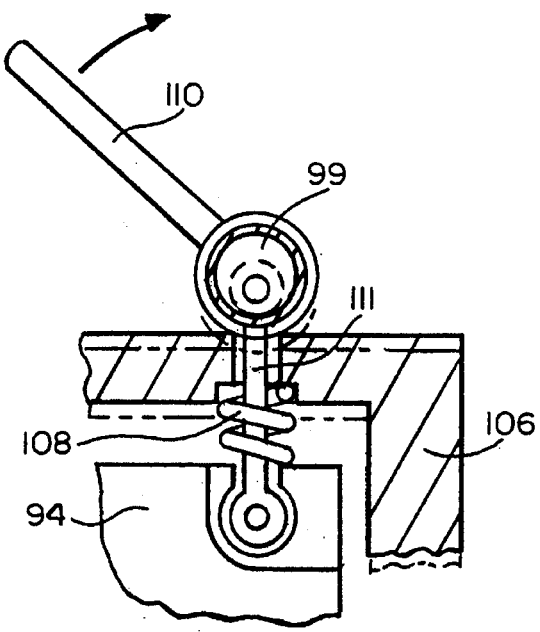

ASYMMETRIC PLANETARY GEAR VARIABLE SPEED TRANSMISSION

FIELD OF THE INVENTION

The present invention relates to infinitely variable speed power transmissions.

BACKGROUND OF THE INVENTION

Many mechanical power transmissions use hydraulics, planetary gear assemblies and/or chain belt combinations to accomplish infinitely variable speed power transmission. Such transmissions rely on traction for transmitting power. However, in automotive applications, such transmissions are too heavy and too large in size to practically transmit torque in a range of for example 250–300 ft./lbs. Presently used four speed electronically controlled transmissions have a multitude of components and are very complex, particularly in performing forward gear selection and shifting.

SUMMARY OF THE INVENTION

The present invention provides an improved mechanical geared infinitely variable speed transmission having a torque range within the expected performance of an automotive transmission, wherein forward speed change is affected by asymmetric gear pairs within a transmission rotor controlled by a small power output manipulator. Transmission speed changes are made with full time gear engagement.

The transmission of the present invention includes a modified planetary gear assembly within a rotor having several stages of asymmetric gear pairs such as two or more which serve to reduce the torque output within the rotor resulting in a torque reduction, through the inefficiency of the gear pairs, of for example at least 67%. Torque is reduced only within the rotor.

The transmission of the present invention is based upon utilizing gear inefficiency specifically designed to the highest possible level. The maximum inefficiency is one directional only, and highly efficient in the opposite direction. This is achieved by pairing spur gears with helical gears of the same pitch mounted on an angle equal to the helix angle within a torque reducing rotor mounted axially about the transmission drive line. Torque reduction is equal to the cosine of the included angle of meshing intersection of the helical gears with the spur gears. What is considered inefficiency in a conventional gearbox becomes rotational force on the rotor in this invention. Within the rotor this inefficiency, through several stages of asymmetric gear pairs, diminishes the torque input to a small fraction of the original input. The total value of torque is not diminished, but the larger portion of the torque input turns the rotor. When a lower speed ratio is selected, the torque is increased. The preferred torque reduction within the rotor is approximately 70%. Since the torque reduction is one directional only, and a wrap spring about the rotor controls the remaining torque, transmission speed change can be effected easily with a small mechanical force. The gears are arranged inside the rotor so that a slower relative rotation of the final internal gear results in slower rotor output shaft rotation. In effect, the rotor output speed slips relative to the rotor input speed.

A transmission speed manipulator in accordance with the invention can maintain an equal or 1:1 ratio with the rotor assembly rotating in sync with the transmission input. Any desired speed ratio may be maintained, but not lower than the ratio of a constant mesh full time low speed planetary gear set positioned about the output shaft following the output of the rotor. Customarily in automotive applications the low speed gearing provided by the constant mesh planetary gear is in the range of 3.3:1. When the rotor output speed slips below the planetary gear set's output speed, the planetary gear takes over and the rotor's internal mechanism is bypassed. Torque is directly transmitted through the rotor housing to the planetary gearing to output.

Since automobile transmissions customarily operate in a 1:1 or overdrive mode most of the time, and low gear is bypassing the device, the torque reduction geartrain of the rotor is therefore actually operating only a small fraction of the time. The asymmetric helical/spur gear sets are used to reduce torque within the rotor because they do not generate heat and do not operate at high speeds. Alternatively, this type of torque reduction can be accomplished through the use of worm gears, high ratio gear sets, or friction clutches.

The speed manipulator of the invention, which controls engagement of the torque reducing gear trains of the rotor, can be mechanical, hydraulic, electrical, or any device which can maintain a steady equal or lower speed than the input speed. The required force needed to effect speed change speed is very small, for example, less (but not more than) approximately 50 lb./in. A preferred device is a mechanical traction device which has infinitely adjustable mechanical traction and which is also of simple construction small size. Speed change can be effected in stationary or in rotational mode. Reverse gear and other transmission components are not shown in connection with the invention but are fully compatible with the invention.

In accordance with one aspect of the invention, a variable forward speed mechanical transmission includes a transmission output torque reducing rotor assembly adapted to rotate about an axial center line of a drive train which includes an input rotor connected at one end to a power output and having an outer radial control surface at an opposite end, a control hub having an outer radial control surface adjacent to and radially flush with the outer radial control surface of the input rotor and internally meshed with a symmetrical helical/spur gear train having a torque reducing effect when turning through the inefficiency of angular helical/spur gear interfaces terminating at meshed connection with a spur gear on an output shaft, and a wrap spring about the adjacent flush outer radial control surfaces of the input rotor and outer hub to control relative rotation of the input rotor to the control hub.

In accordance with another aspect of the invention, a speed control device provides infinitely variable adjustment of the relative rotation of the input rotor to the control hub by interconnection with a control tang of a wrap spring about control surfaces of the torque reducing rotor, wherein the speed control manipulator includes a speed control gear in mesh with a control gear of the transmission rotor and mounted axially upon a cone rotated by frictional contact with an inner radial surface of the cone with an elliptical shaft mounted through the cone and supported within a yoke adjustable in a vertical plane to change the point of rotational contact between the inner surface of the cone and the shaft to thereby change the rate of rotation of the speed control gear to change the force exerted by the speed control gear upon the control tang of the wrap spring.

BRIEF DESCRIPTION OF THE DRAWINGS

In the annexed drawings:

FIG. 10 is a partially sectioned side view of a portion of a speed control device of the present invention;

FIG. 11 is an end view of a funnel-shaped rotor and elliptical shaft of the speed control device of the present invention;

FIG. 12 is an opposite end view of a funnel-shaped rotor and elliptical shaft of the speed control device of the present invention; and FIG. 13 is a partially sectioned side view of a portion of a speed control device of the present invention.

DETAILED DESCRIPTION OF PREFERRED EMBODIMENTS

Figure 1:
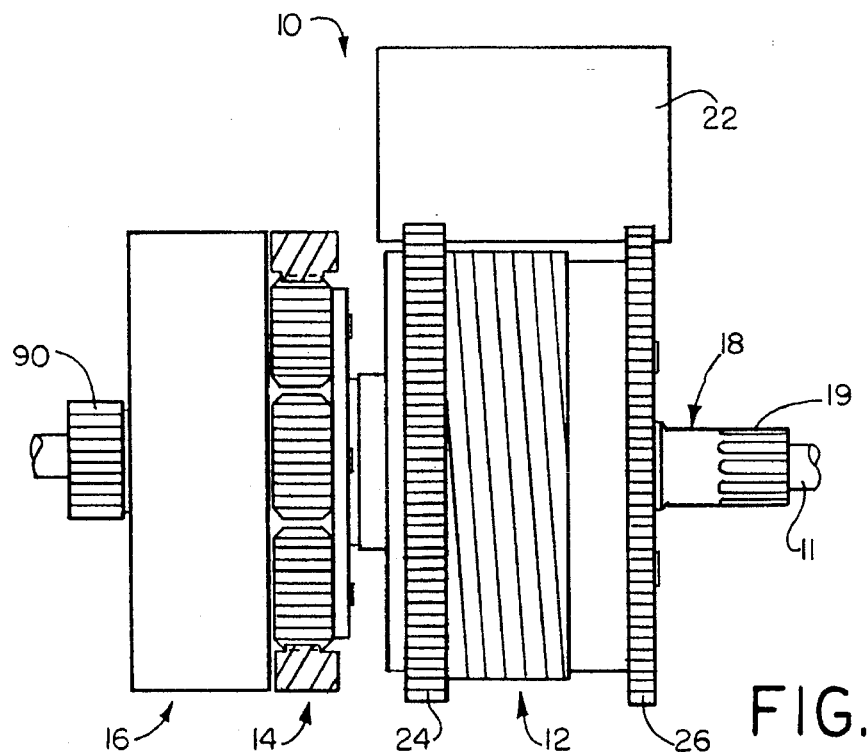
FIG. 1 is a side view of the transmission of the present invention.

With reference to FIG. 1, there is shown from the side a transmission assembly, indicated generally at 10, which includes an internally geared rotor assembly 12, planetary gear set 14, and a dual sprague clutch assembly housing 16, each positioned and mounted to rotate radially about a common axis. As is known in the art, the transmission 10 may be mounted to rotate radially about a core shaft 11 which may be, for example, a hydraulic pump shaft. Alternatively, the transmission 10 may be mounted and journaled to rotate against external bearings (not shown) as is also known in the art. Also, the transmission assembly 10 can be easily adapted to fit within common transmission housings of, for example, automobiles without substantial modification and redesigning of the power drive train.

A shaft portion 20 of a power input rotor 18 protrudes from rotor assembly 12 and is provided with primary spline teeth 19 for engagement with an engine output gear (not shown). A speed control manipulator, represented schematically by box 22, is positioned for engagement with a control gear 24 and a reference gear 26 at respective opposing lateral ends of rotor assembly 12. Through a torque reducing gear arrangement within rotor assembly 12, controlled by speed control manipulator 22 and transmitted through the dual sprague clutch assembly 16 to an output gear 90, the forward driving torque output of the transmission 10 can be infinitely adjusted as described in detail below.

Figure 2:
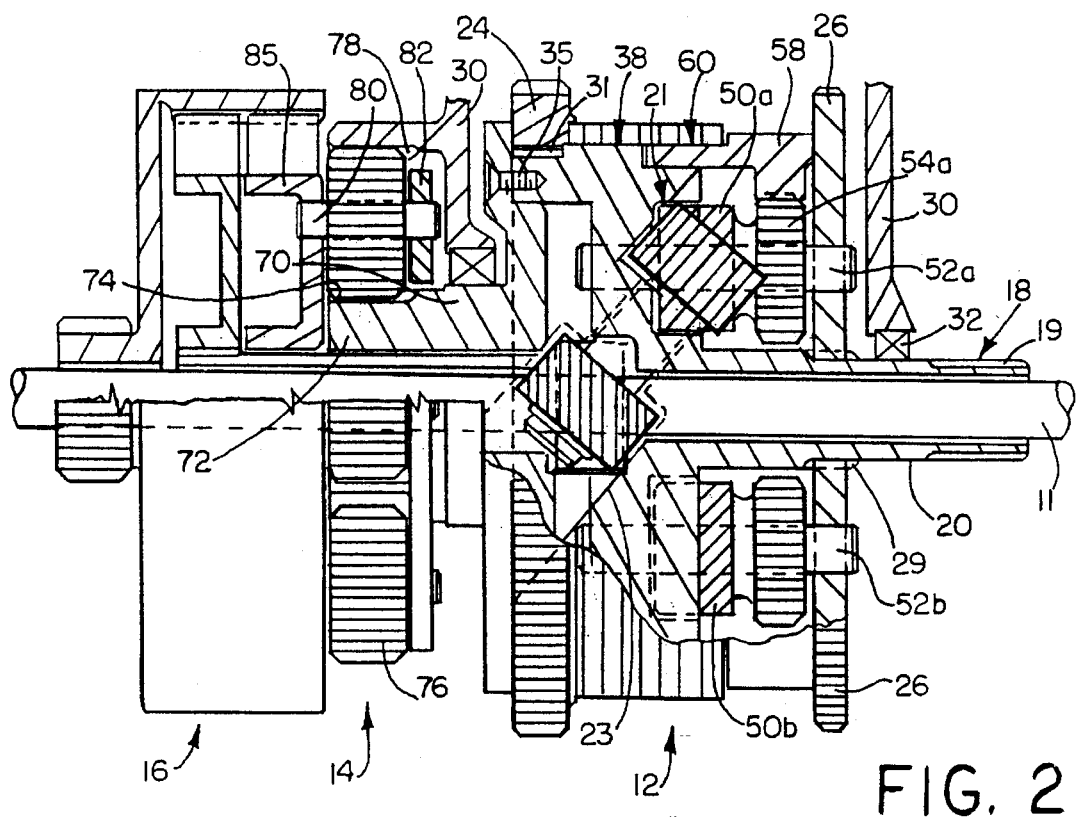
FIG. 2 is a partially sectioned side view of the transmission of the present invention.

FIG. 2 illustrates in partial cutaway a side view of rotor assembly 12, planetary gear set 14, and dual sprague clutch assembly 16 as shown in FIG. 1. The speed control manipulator 22 is not shown in FIG. 2. Beginning at the right side of FIG. 2, input rotor 18 enters into transmission housing 30 through bearing 32. Input rotor 18 includes secondary spline teeth 29 inside transmission housing 30 for rotational driving engagement of reference gear 26. Input rotor 18 continues linearly beyond reference gear 26 to extend radially, terminating with a radially peripheral speed control surface 38 at a radially outermost portion.

Figure 3:
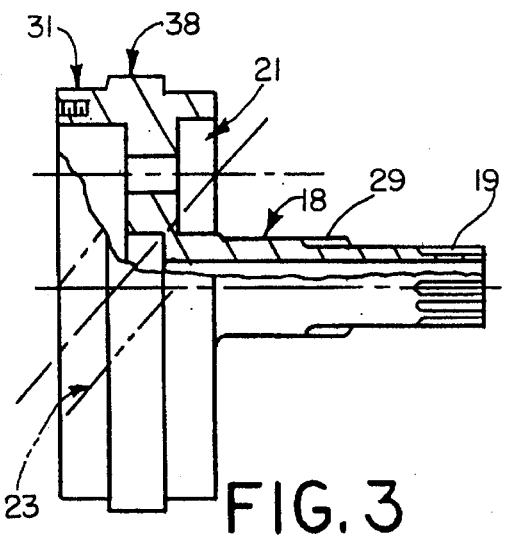
FIG. 3 is a partially sectioned side view of an input rotor of the transmission of the present invention.

FIG. 3 illustrates input rotor 18 in isolation in profile and partially cutaway, showing primary spline teeth 19, secondary spline teeth 29, speed control surface 38, a horizontal gear mounting cutout 21, diagonal gear mounting cutout 23 shown in phantom, and a needle bearing surface 31 for control gear 24.

Figure 4:
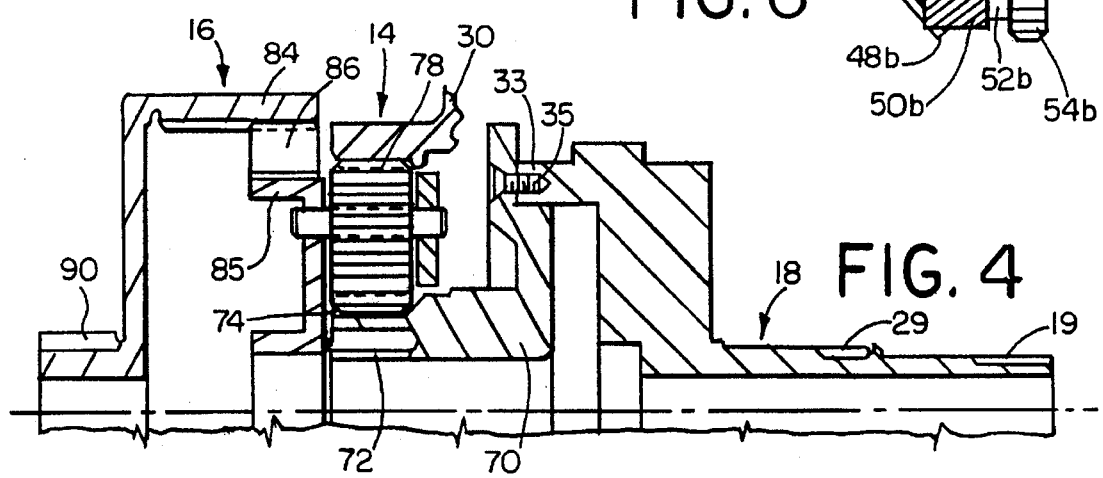
FIG. 4 is partially sectioned side view of a portion of an input rotor drive train of the transmission of the present invention.

FIG. 4 illustrates the components of the torque transmission path of input rotor 18, planetary gear set 14 and dual sprague clutch assembly 16 in isolation. A forwardmost end 33 of input rotor 18 is attached, for example by screws 35, to an input rotor extension 70. As described in greater detail below, input rotor extension 70 is in mesh with planetary gear set 14 the output of which is attached to one of the clutches of the dual sprague clutch assembly 16 to drive the final output gear 90.

As shown in FIG. 2, in the rotor assembly 12, the input rotor 18 is integrated with a control hub 58. The torque transmission path from control hub 58 is described with reference to FIGS. 2, 5, 6 and 7. The control hub 58 is essentially a ring gear which has an outer peripheral control surface 60 (adjacent to and radially flush with control surface 18 of input rotor 38) and internal gear teeth 56.

Figure 6:
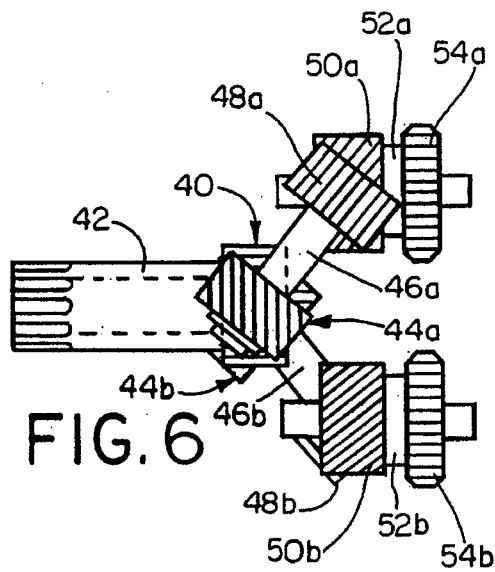
FIG. 6 is a side view of two asymmetric helical/spur gear trains and an output shaft of the transmission of the present invention.
Figure 5:
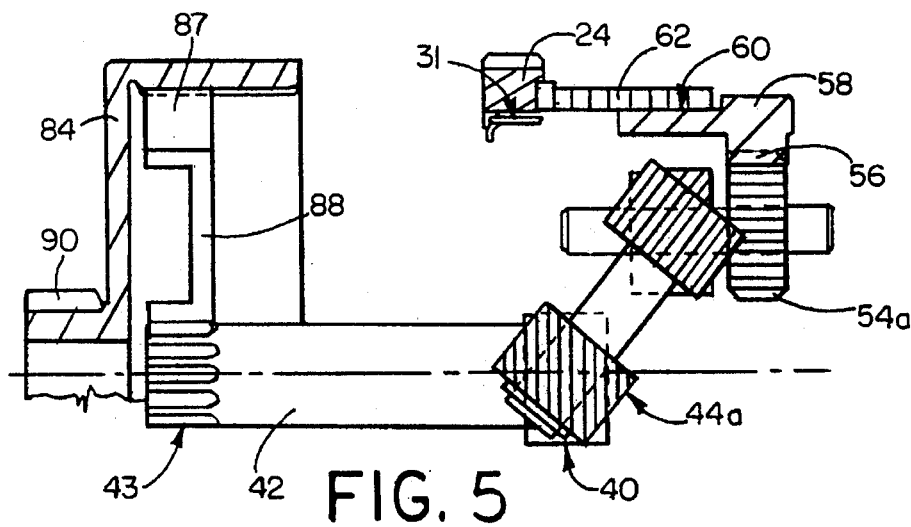
FIG. 5 is a side view of a portion of a control hub drive train of the transmission of the present invention.
Figure 7:
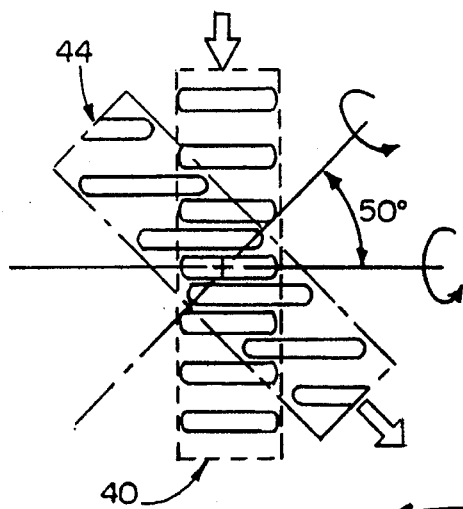
FIG. 7 is a schematic illustration of gear teeth meshing of a helical gear with a spur gear.

With reference to FIGS. 5 and 6, a main sun gear 40 at an end of an output shaft 42 is in mesh with one end of a helical/spur gear train. The torque reducing asymmetric helical/spur gear train is now described beginning at main sun gear 40. Main sun gear 40 is in constant meshed engagement with an asymmetric pair of helical planetary gears 44a and 44b positioned, for example, at radially opposite points of main sun gear 40 and mounted at an angle equal to the helix angle to mesh with main sun gear 40. As shown in FIG. 7, the angle at which helical planetary gears 44a and 44b are mounted relative to main sun gear 40 can be, for example, 50°, but can also be mounted at any angle within a range of for example approximately 40° to approximately 90°. The final torque reduction ratio of the asymmetric helical/spur gear train is equal to the cosine of the mounting angle of the helical planetary gears 44a and 44b relative to the main sun gear 40. The greater the angle of meshing intersection of helical planetary gears 44a and 44b with main sun gear, the greater the torque transmitting inefficiency of the transmission, thereby increasing the torque reducing capacity of the transmission.

As shown in FIG. 6, each asymmetric helical planetary gear, 44a and 44b, is mounted at one distal end of a respective diagonally mounted shaft, 46a and 46b, each of which has a respective spur gear, 48a and 48b, mounted at an opposite distal end thereof. The only difference between shaft 46a and shaft 46b and the respective attached gears is the radial position relative to main sun gear 40 and the symmetrically opposite diagonal angle of departure away from main sun gear 40 to the axial center line of output shaft 42. Spur gears 48a and 48b are in respective constant meshed engagement with horizontally mounted asymmetric helical gears 50a and 50b which are mounted on respective horizontal shafts 52a and 52b with spur gears 54a and 54b. As shown in FIG. 2, horizontal shafts 52a and 52b are rotationally supported at distal ends within reference gear 26 and the radially extending portion of input rotor 18. Cutout portion 21 of input rotor 18 accommodates horizontally mounted asymmetric helical gears 50a and 50b. Cutout portion 23 of input rotor 18 accommodates diagonally mounted helical planetary gears 44a and 44b.

In FIG. 2 and FIG. 5, there is shown the meshed engagement of spur gear 54a with control hub ring gear 56 formed in the internal circumference of control hub 58. As previously noted, control hub 58 has a slightly recessed outer radial surface 60 which is radially flush with control surface 38 of input rotor 18 to form a flush uniform input/output control surface (surfaces 38 and 60 combined) over the entire circumference of which a speed control wrap spring 62 is positioned. Control gear 24 is positioned to rotate about the radial surface area 31 of forward end 33 of input rotor 18 as shown in FIG. 2. Surface area 31 of input rotor 18 may include periodic pockets for receiving needle bearings upon which control gear 24 rotates.

Wrapped about the adjacent radially flush control surfaces 38 and 60 is a wrap spring 62 which interlocks in rotation input rotor 18 with control hub 58 when control gear 24 rotates at the same speed as input rotor 18 and reference gear 26 (in mesh with gear teeth 29 of shaft portion 19 of input rotor 18). When input rotor 18 and control hub 58 are locked in synchronous rotation under the radially constrictive force of wrap spring 62, the torque output ratio of the transmission is 1:1 with the entire rotor 12 spinning at the velocity of the input rotor 18. As the radially constrictive force of wrap spring 62 is reduced by counter-rotating pressure exerted on control tang 68 of wrap spring 62 (as a result of relative slower rotation of control gear 24), input rotor 18 and control hub 58 are no longer locked in synchronous rotation, such that control hub 58 is allowed to slip relative to the input rotor 18, thereby inducing rotation of the asymmetrical helical/spur gear train by the following sequence: control hub ring gear 56 rotating (slipping relative to the rate of rotation of input rotor 18) to rotate spur gears 54a and 54b which rotate respective shafts 52a and 52b which rotate horizontally mounted helical gears 50a and 50b which induce rotation of diagonally mounted spur gears 48a and 48b which rotate respective shafts 46a and 46b which rotate helical planetary gears 44a and 44b which induce rotation of main sun gear 40 and output shaft 42. The torque thus transmitted from input to output is substantially reduced through the frictional inefficiency of the asymmetric helical/spur gear train leading to output shaft 42. The input torque is reduced to an extent that the speed control manipulator 22 can easily control the rotational speed of control gear 24 and thus the pressure upon the control tang 68 of wrap spring 62 to release the wrap spring from the control surfaces to allow slipping of control hub 58. Of course, to give additional torque reducing capacity to the rotor 12, additional sets of the described helical/spur gears could be incorporated into the rotor.

Figure 8A:
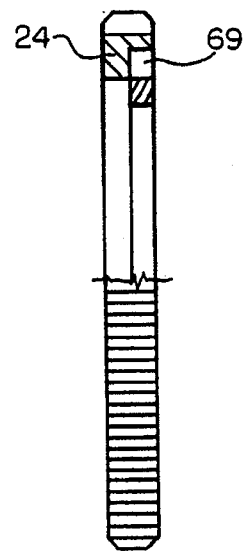
FIG. 8A is an axial side view of a radial portion of a control gear in contact with a control tang of a wrap spring in accordance with the transmission of the present invention.
Figure 8B:
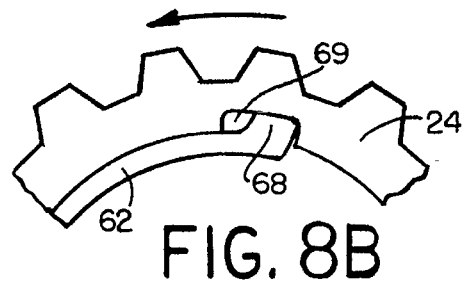
FIG. 8B is a partially cut away transaxial side view of a control gear in contact with a control tang of a wrap spring in accordance with the transmission of the present invention.

As shown in FIGS. 8A and 8B, control tang 68 fits within a pocket 69 in the internal periphery of control gear 24 so that as control gear 24 is slowed in the direction indicated the resulting force upon the control tang 68 in the same direction unwraps or reduces the inward radially constrictive force of wrap spring 62 upon the control surfaces. Thus, torque speed change is effected only when a counter-rotational force is exerted upon control tang 68 of wrap spring 62 by control gear 24. This force is exerted upon control tang 68 by control gear 24 at any time control gear 24 is rotating at a speed less than reference gear 26, i.e., the speed of the transmission input. The control manipulator 22 (in meshed engagement with control gear 24 as described below) needs to exert force upon the control gear 24 sufficient only to slow the rotational speed of control gear 24 to move control tang 68 against the radially inward bias of wrap spring 62.

Referring again to FIGS. 2 and 4, input rotor 18 is connected to planetary gear set 14 by attachment to input rotor extension 70. The full time engagement of the input rotor 18 to the planetary gear set 14 provides an absolute minimum gear ratio for high torque/low speed operation as is well known in the art. Spur gear teeth 74 are provided on a distal end 72 of input rotor extension 70 to serve as a sun gear for planetary gears 76 of planetary gear set 14. Ring gear teeth 78 in the internal circumference of transmission housing 30 are in mesh with planetary gears 76 supported by planetary gear shafts 80 supported by and journalled to rotate within a planetary gear carrier 82 at one end and planetary gear housing 85 (which also serves as a sprague clutch support) at the other end.

Planetary gear set 14 produces a driving ratio equivalent to the first gear or low gear in a conventional transmission, with a gear ratio of, for example, between 3:1 to 4:1. The main sun gear 40 thus has a variable ratio of, for example, between 1:1 and 5:1. The transmission of this embodiment thus has an absolute minimum ratio of that of the planetary gear set 14 below which the torque reduction action of the rotor 12 cannot drop. Otherwise it will be appreciated that the transmission may consist solely of the described rotor 12 and the accompanying speed control manipulator 22 in any particular application.

To determine whether the final output of the transmission will be driven by the input rotor/planetary gear arrangement of FIG. 4, or the control hub/torque reducing gear train of FIG. 5, both arrangements are connected to the dual sprague clutch assembly 16 as shown in FIGS. 2, 4 and 5. As shown in FIG. 4, a sprague 86 is attached to the outer radial surface of planetary gear housing 85 and is in contact with the internal radial surface of clutch case 84. The final output gear 90 of the transmission is attached to clutch case 84. As shown in FIG. 5, spur gear teeth 43 at a distal end of output shaft 42 are engaged with a second sprague supporting member 88 with second sprague 87 attached to an outer radial surface thereof. The second sprague 87 is also in contact with the internal radial surface of clutch case 84. Thus if the second sprague supporting member 88 is spinning faster than planetary gear housing 85, then the contact of second sprague 87 against clutch case 84 becomes the rotational driving force of clutch case 84 and the final output gear 90 attached thereto. Conversely, if the planetary gear housing 85 is spinning faster than the second sprague supporting member, then sprague 86 (as directly driven by input rotor 18) provides the rotational driving force of clutch case 84 and the final output gear 90 attached thereto. Both clutches are free-running in the same radial direction. Whichever clutch rotates fastest drives the final output gear 90 attached to clutch case 84. In this manner, the transmission can maintain a minimum speed ratio of, for example, approximately 3.5:1 at any time the rotor output speed slips below the minimum planetary gear set speed ratio. For example, in the state of low speed/high torque, torque is transmitted through input rotor 18, input rotor extension 70, to planetary gears 76, to planetary gear clutch 86, to clutch case 84, to output gear 90.

FIG. 9 again shows transmission assembly 10 (including rotor 12, planetary gear set 14, and dual sprague clutch housing 16) with rotor 12 in meshed engagement with a mechanical speed control manipulator indicated generally at 22. As shown schematically, the speed control manipulator 22 can be mounted directly on top of transmission 10 in any configuration which allows for constant mesh of a speed manipulator control gear with rotor control gear 24 and reference gear 26 of rotor 12 as described below. Although the speed control manipulator 22 described herein is mechanical, it is to be appreciated that hydraulic, electric, electromechanical, electronically controlled and other types of manipulators including hybrids thereof capable of the described operation can be used in connection with the transmission of this invention.

Figure 9:
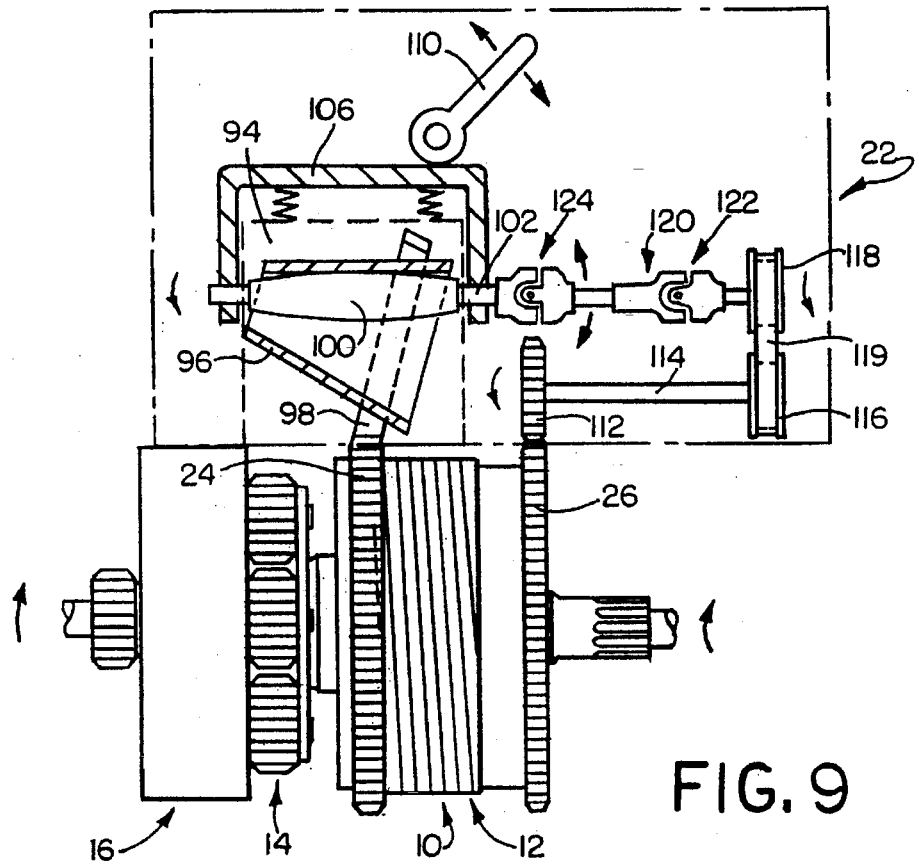
FIG. 9 is side view of a transmission of the present invention in meshed engagement with a speed control device of the present invention shown in partial section.

FIG. 10 illustrates in isolation a portion of a mechanical speed control manipulator 22 which includes a speed control gear housing 94 which houses a cone 96 upon which a speed control gear 98 (both shown in cross-section) is coaxially mounted at, for example, the angle shown, with a top side edge of the cone 96 horizontal, to position the teeth of speed control gear 98 for meshed engagement with control gear 24 of rotor 12 as shown in FIG. 9. Cone 96 is supported to axially rotate about bearings 93 and 95 mounted within the speed control gear housing 94. The internal surface of cone 96 is precisely finished to, for example, sixteen thousandths of one inch. Cone 96 is rotated about one point of its internal diameter surface by frictional contact with a slightly crowned elliptical spool 100 mounted upon a spool shaft 102 which is supported at each respective distal end by bearings 103 and 104. Bearings 103 and 104 are supported in a yoke 106 which fits over and is attached to the top of gear housing 94 by rods 109 and 111 surrounded by springs 107 and 108 respectively. Movement of a manipulator lever 110, connected to yoke 106 by a cam 99 at a top end of rod 111, changes the linear attitude of the yoke 106 relative to gear housing 94, to change the angular attitude of spool shaft 102 in the vertical plane, and consequently the point of contact between spool 100 and the interior surface of cone 96 to thereby change the rotational speed (by changing the radius of rotation) of speed control gear 98 and consequently the allowed rotational speed of control gear 24 (in mesh with speed control gear 98), and consequently the pressure exerted upon the control tang 68 of wrap spring 62 to control the described torque reduction/slipping action of rotor 12.

The large end A of cone 96 has a diameter of, for example, 4.0 times the mean shaft diameter of spool 100 and, the small end B of cone 96 has a diameter of, for example, 1.2 times the mean shaft diameter of spool 100 as shown in FIGS. 11 and 12 respectively to define the range of speed variation of speed control gear 98.

FIG. 13 illustrates the manner in which the manipulator lever 110 is connected to control gear housing 94 by shaft 111 about which spring 108 is positioned. One end of shaft 111 terminates off center within a cam 99 attached to manipulator lever 110 which is rotated upon movement of lever 110 to draw control gear housing 94 upward toward yoke 106 against the force of spring 108, to thereby change the attitude of spool shaft 102 and the point of contact of spool 100 upon cone 96.

As shown in FIG. 9, a reference gear driving input to the speed control manipulator 22, to rotationally drive spool shaft 102 and speed control gear 98 within the control gear housing 94 at the same rate as the power input to the transmission, is provided by a drive linkage beginning with reference gear 26 of rotor 12 in meshed engagement with a transfer gear 112 attached to shaft 114 which terminates at an opposite end with a sprocket or pulley 116 in linked or belted rotational engagement with sprocket or pulley 118 by a chain or belt 119. The drive train ratio of sprocket 116 to sprocket 118 is, for example 1:1.2 to match the minimum diameter of small end B of cone 96. Sprocket 118 is at one end of a spool shaft drive line, indicated generally at 120, which includes universal joints 122 and 124 which provide vertical planar adjustable driving rotation of spool shaft 102 in accordance with any adjustment of the attitude of spool shaft 102 by yoke 106 as described above. By this arrangement there is provided a constant reference geared driving input to spool shaft 102 and speed control gear 98 at all possible points of adjustment of yoke 106. It is to be noted that the described adjustment of the speed control manipulator 22 by movement of lever 110 can be done irrespective of the state or speed of the transmission rotor 12 so that the output speed of the transmission can be adjusted or selected at any operational point between stationary and top speed.

In another embodiment of the speed control manipulator 22 not shown by the drawings, an electric motor can be used to rotationally drive spool shaft 102 to rotate cone 96 and speed control gear 98, with the input speed of the motor determined by input from an electronic speed sensor directed to the transmission input as is known in the art. The speed of the speed manipulator motor is then adjusted relative to the sensed transmission input speed to increase or decrease the torque output of the transmission.

Although the invention has been shown and described with respect to one version of a preferred embodiment, equivalent alterations and modification of the components and methods of the invention may occur to those skilled in the art upon reading and understanding this specification. The present invention includes all such equivalent alterations and modifications, and is limited only by the scope of the following claims.

STATEMENT OF INDUSTRIAL APPLICATION

It will be appreciated that the invention may be used as a power transmission in a wide variety of power generation and output devices.

What is claimed is:

1. A variable speed power transmission comprising, a rotor adapted to rotate about a linear axis of a transmission drive line, said rotor comprising an input hub and a control hub, said input hub connected to a power input source and operatively connected to drive a transmission output gear, a gear train internal to said rotor and connected between said input hub and said control hub to reduce the torque between them below the torque between the input hub and said transmission output gears, said input and control hubs having adjacent radially flush outer peripheral surfaces, and means for controlling a rate of rotation of said input hub relative to the rate of rotation of said control hub including a wrap spring positioned in contact with said flush radially outer peripheral surfaces.

2. A variable speed power transmission comprising, a rotor adapted to rotate about a linear axis of a transmission drive line, said rotor comprising an input hub and a control hub, said input hub connected to a power input source and operatively connected to drive a transmission output gear, said control hub operatively connected to a gear train internal to said rotor also operatively connected to drive said output gear.

said input and control hubs having adjacent radially flush outer peripheral surfaces.

means for controlling a rate of rotation of said input hub relative to a rate of rotation of said control hub by contact with said flush radially outer peripheral surfaces said gear train including asymmetric gear pairs mounted to rotate within said rotor in mesh with a sun gear of an output shaft.

3. The transmission of claim 2 wherein said asymmetric gear pairs include helical gears in mesh with spur gears.

4. The transmission of claim 3 wherein an internal ring gear of said control hub is in mesh with at least one gear of said asymmetric gear pairs.

5. The transmission of claim 2 wherein said means for controlling a rate of rotation of said input hub relative to a rate of rotation of said control hub by contact with said radially flush outer peripheral surfaces is a wrap spring positioned about said radially flush outer peripheral surfaces.

6. The transmission of claim 5 further including a control gear engaged with a control tang of said wrap spring.

7. The transmission of claim 6 wherein said control gear is journalled to rotate about said input hub.

8. The transmission of claim 6 further including a speed control device engaged with said control gear to control a speed at which said control gear rotates to control a resultant force upon said tang of said wrap spring.

9. A variable speed Dower transmission comprising, a rotor adapted to rotate about a linear axis of a transmission drive line, said rotor comprising an input hub and an control hub, said input hub connected to a power input source and operatively connected to drive a transmission output gear, said control hub operatively connected to a gear train internal to said rotor also operatively connected to drive said output gear, said input and control hubs having adjacent radially flush outer peripheral surfaces, means for controlling a rate of rotation of said input hub relative to a rate of rotation of said control hub by contact with said flush radially outer peripheral surfaces and further comprising a planetary gear set axially adjacent said rotor, said planetary gear set being in mesh with an internal ring gear in a transmission housing of said transmission, and in mesh with an extension of the input hub.

10. The transmission of claim 9 wherein a shaft supporting planetary gears of said planetary gear set is connected to a sprague clutch assembly within a clutch housing having an output gear attached to an exterior of said housing.

11. A variable speed power transmission comprising, a rotor adapted to rotate about a linear axis of a transmission drive line, said rotor comprising an input hub and a control hub, said input hub connected to a power input source and operatively connected to drive a transmission output gear, said control hub operatively connected to a gear train internal to said rotor also operatively connected to drive said output gear, said input and control hubs having adjacent radially flush outer peripheral surfaces.

means for controlling a rate of rotation of said input hub relative to a rate of rotation of said control hub by contact with said flush radially outer peripheral surfaces and wherein an output shaft connected to said control hub through said gear train is connected to a sprague clutch assembly, said sprague clutch assembly housed within a clutch housing, and an output gear attached to an exterior of said clutch housing.

12. A variable speed transmission comprising, a torque reducing rotor assembly, said rotor assembly comprising an input hub and a control hub, said input hub connected to a transmission output gear, and said control hub connected to an output shaft through a torque reducing asymmetric gear train, and a transmission speed control device in operative engagement with flush external adjacent peripheral surfaces of said input and control hubs operatively to control the rate of rotation of said input hub relative to said control hub.

13. A power transmission comprising, a torque reducing rotor assembly, said torque reducing rotor assembly comprising a rotationally driven input hub and a coaxially adjacent control hub, said input and control hubs having radially flush outer peripheral speed control surfaces, asymmetric helical planetary gears mounted upon respective asymmetric shafts and in meshed engagement with a main sun gear of an output shaft at opposite radial sides of said sun gear, each of said asymmetric shafts mounted at an angle to said output shaft and having a spur gear attached to an end opposite said helical planetary gears to rotate with said planetary gears, said spur gears in meshed engagement with horizontally mounted asymmetric helical gears, said horizontally mounted asymmetric helical gears being on a common shaft with second asymmetric spur gears in meshed engagement with an internal ring gear of said control hub, said flush outer peripheral speed control surfaces of said input and control hubs at least partially covered by and in contact with a radially constrictive wrap spring, said wrap spring having a control tang operative to control the constrictive force of said wrap spring upon said speed control surfaces of said input and control hubs to interlock said input and control hubs in synchronous rotation and to allow one of the hubs to rotate independently of the other.

* * * * *